United States Patent
Yoshima

(10) Patent No.: US 8,742,291 B2
(45) Date of Patent: Jun. 3, 2014

(54) METHOD OF CONTROLLING ARC WELDING IN A TANDEM ARC WELDING SYSTEM

(75) Inventor: Kazumasa Yoshima, Osaka (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 11/917,267

(22) PCT Filed: Feb. 9, 2007

(86) PCT No.: PCT/JP2007/052314
§ 371 (c)(1),
(2), (4) Date: Dec. 12, 2007

(87) PCT Pub. No.: WO2007/144997
PCT Pub. Date: Dec. 21, 2007

(65) Prior Publication Data
US 2009/0294428 A1    Dec. 3, 2009

(30) Foreign Application Priority Data
Jun. 14, 2006   (JP) .................... 2006-164304

(51) Int. Cl.
*B23K 9/12*    (2006.01)
(52) U.S. Cl.
USPC .................................................. 219/124.32
(58) Field of Classification Search
USPC .......... 219/122, 124.1, 124.32, 130.5, 137.7, 219/139
See application file for complete search history.

(56) References Cited

U.S. PATENT DOCUMENTS

| | | | |
|---|---|---|---|
| 2,868,956 A | | 1/1959 | Lobosco |
| 3,852,561 A | * | 12/1974 | Brubaker et al. ........ 219/124.34 |
| 4,724,302 A | * | 2/1988 | Penney et al. ............ 219/130.21 |
| 5,155,330 A | * | 10/1992 | Fratiello et al. ........... 219/137 R |
| 5,486,679 A | | 1/1996 | Hamura et al. |
| 5,597,498 A | * | 1/1997 | Sunayama et al. ....... 219/124.34 |
| 6,172,333 B1 | * | 1/2001 | Stava ...................... 219/137 PS |
| 6,177,650 B1 | | 1/2001 | Watanabe et al. |

FOREIGN PATENT DOCUMENTS

| | | | | |
|---|---|---|---|---|
| GB | 1579607 A | | 11/1980 | |
| JP | 55-49876 U | | 4/1980 | |
| JP | 57068277 A | * | 4/1982 | ............... B23K 9/12 |
| JP | 05057439 A | * | 3/1993 | ............... B23K 9/12 |
| JP | 06-179077 | | 6/1994 | |
| JP | 06-179077 A | | 6/1994 | |
| JP | 08-243751 | | 9/1996 | |
| JP | 10-006005 | | 1/1998 | |
| JP | 10-006005 A | | 1/1998 | |
| JP | 2001-113373 | | 4/2001 | |
| JP | 2001-113373 A | | 4/2001 | |

(Continued)

OTHER PUBLICATIONS

International Search Report Dated Mar. 20, 2007.

(Continued)

*Primary Examiner* — Henry Yuen
*Assistant Examiner* — Ayub Maye
(74) *Attorney, Agent, or Firm* — Pearne & Gordon LLP

(57) ABSTRACT

A method of controlling arc welding, which method shifting the speed of welding operation continuously and mildly. By so doing, a sharp change in the speed of weld wire supply, which is caused as the result of efforts to try to comply with an abrupt change in operation speed, can be moderated. This helps keeping a welding operation under a stable control.

4 Claims, 5 Drawing Sheets

(56) References Cited

FOREIGN PATENT DOCUMENTS

| | | | | |
|---|---|---|---|---|
| JP | 2002-361413 A | 12/2002 | | |
| JP | 2002-361414 | 12/2002 | | |
| JP | 2003-062669 A | 3/2003 | | |
| JP | 2003062669 A * | 3/2003 | ............... | B23K 9/12 |
| JP | 2003-145270 | 5/2003 | | |
| JP | 2004-042121 A | 2/2004 | | |
| JP | 2004042121 A * | 2/2004 | ............. | B23K 9/067 |

OTHER PUBLICATIONS

Chinese Office action for Appl. No. 2007800000576.6 dated Aug. 12, 2010.

European Search Report dated Apr. 26, 2010.

Japanese Office action for JP2007-542172 dated Feb. 1, 2011.

Chinese Office Action for Application No. 200780000576.6 dated Mar. 1, 2012.

* cited by examiner

METHOD OF CONTROLLING ARC WELDING IN A TANDEM ARC WELDING SYSTEM

FIELD OF THE INVENTION

The present invention relates to a method of controlling welding operation performed by an arc welding device mounted on a welding robot manipulator or the like facility.

BACKGROUND OF THE INVENTION

At the welding lines in manufacturing firms, efforts are being made to improve the total operating efficiency by increasing the speed of welding operation. An increasing number of firms are trying to introduce a high-speed welding. Aiming to secure molten weld metals for enough volume in high-speed welding, some wire feeders capable of supplying weld wire for a sufficient amount are already made available.

Meanwhile, a tandem arc welding process has also been introduced as a means of increasing the speed of welding taking advantage of the technology of the above high-capacity wire feeders. In a tandem arc welding system, an integrated 2-electrode welding torch or two single-electrode welding torches disposed separated to each other by a certain specific distance is provided at the tip end part of a welding robot or the like device. A certain specific action is performed at a certain specific speed under a certain control in accordance with a certain operation program for carrying out a welding operation. The operation program is provided based on an assumption that in a welding section the two electrodes each including its weld wire disposed penetrating through the electrode are orientated substantially on a welding line, in front and the rear arrangement.

Now, a tandem arc welding system is described in its outline formation and operation referring to FIG. 1. FIG. 1 shows the outline of mechanical structure of a tandem arc welding system having an integrated 2-electrode welding torch. Integrated 2-electrode welding torch 150 is mounted on a welding robot manipulator or the like working gear, which is not shown. The torch travels on the surface of welding object 160 along a certain specified line for welding. A device which puts the robot manipulator, etc. into operation is connected with control unit 120. Control unit 120 is connected with two welders, 130 and 140. Respective welders, 130 and 140, are provided with a weld wire feeder, which is not shown. Each weld wire feeder feeds a weld wire, not shown, to welding torch 150, viz. two weld wires are delivered to the torch. Within welding torch 150, each of the two weld wires is transferred penetrating through an electrode tip, not shown, respectively. The electrode tips are connected to output terminals of welder 130 and welder 140 via power cable 131 and power cable 142, respectively. Electric powers from welder 130 and welder 140 are supplied to the weld wires, respectively. Welding object 160 is connected to the ground terminals of welder 130 and welder 140 by way of grounding cable 132 and grounding cable 141. The arcs generated between the weld wires and welding object 160 form welding current circuits.

Control unit 120 houses in it an operation program and welding conditions. Control unit 120 controls action of the welding robot manipulator, etc. in accordance with the operation program. Furthermore, control unit 120 transfers, corresponding to the action, those instructions and parameters to welder 130 and welder 140 via control line 133 and control line 143. Welder 130 and welder 140 control their own weld wire feeders so that the weld wires are supplied for specified amount in accordance with the parameters received from control unit 120.

In this way, a tandem arc welding system provides a certain specific welding on a welding object 160 at a certain specific place.

Now in the following, description is made on how the tandem arc welding is carried out referring to FIG. 2. FIG. 2 illustrates a scene where a tandem arc welding is being carried out with an integrated 2-electrode welding torch, in the direction from the right to the left. As to the terminologies regarding the direction of welding, "fore-going" means that which is going in the front, while "hind-going" means that which is going in chase of the "fore-going". In the inside of nozzle 210 of integrated 2-electrode welding torch 150 (ref. FIG. 1), there are two electrode tips, fore-going electrode tip 201 and hind-going electrode tip 202, disposed at a certain specific electrode-to-electrode distance. Fore-going electrode tip 201 is supplied with fore-going weld wire 203, whereas hind-going electrode tip 202 is supplied with hind-going weld wire 204.

Fore-going weld wire 203 gets the power from welder 130 (ref. FIG. 1) which is equipped with a welding power supply, not shown, dedicated to the fore-going electrode via fore-going electrode tip 201, and generates fore-going arc 205 between fore-going wire 203 and welding object 160. The heat of arcing melts fore-going wire 203 and welding object 160 to supply molten pool 207 with the molten metals. At the same time, hind-going weld wire 204 gets the power from welder 140 (ref. FIG. 1) which is equipped with a welding power supply, not shown, dedicated to the hind-going electrode via hind-going electrode tip 202, and generates hind-going arc 206 between hind-going weld wire 204 and welding object 160. The heat of arcing melts hind-going wire 204 and welding object 160 to supply molten pool 207 with molten metals. Fore-going wire 203 and hind-going wire 204 are supplied continuously while integrated 2-electrode welding torch 150 (ref. FIG. 1) is traveling at a certain specified speed. Thus, molten metal pool 207 moves ahead and welding bead 270 is formed behind it. A welding operation is conducted in this way.

In the tandem arc welding, where two arcs are generated in proximity, one arc can not help giving influence to the other arc. At the welding start section and at the welding end section, among other sections, the arcs are in transient stage and cause interference to each other. This readily brings the arcs into a state of instability, which calls for an appropriate control on them.

At the welding start section, there is a risk of poor welding, a damage on the tip due to interruption or turbulence of arching, a sputtering, etc. Whereas, at the welding end section, there is an esthetic risk of poor appearance of welding bead 270, in addition to the above-described risk items. Aiming to avoid these risks, new proposals have been made; which include, for example, a control sequence for the welding start and welding end. Patent Document 1 is an example of such proposals.

However, the conventional methods of preventing mutual interference between the two arcs do not function satisfactorily for stabilizing the arcs in the high-speed welding. Molten metal pool 207 constitutes a key factor of the arc instability. For example; since hind-going arc 206 is positioned to generate its arc towards molten metal pool 207, the arc is easily influenced by a disorder in molten metal pool 207. Molten metal pool 207 tends to flow behind under the influence of arcing power of fore-going arc 205 generated by fore-going weld wire 203. Arcing power of hind-going arc 206 generated by hind-going weld wire 204, however, tries to push it back towards the front. So, in order to provide a stabilized molten metal pool 207, a certain balance needs to be established between the two. Molten metal pool 207 and the arcs are in the mutually influential relationship.

Furthermore, in a high-speed welding, a change of welding speed brings the state of molten metal pool 207 into instability. As the results, the arc becomes to be instable, which quite often makes it difficult to accomplish a consistent welding. This phenomenon becomes significant especially at the starting and ending of a high-speed welding. At the welding start, molten metal pool 207 is pulled at high speed when the welding speed is raised sharply. This causes the drawback. In the high-speed operation, the weld wire supply needs to be increased accordingly; abrupt increase of the supply ill-affects a balance established between the supply and the melting. This can be another cause of the inconvenience. On the other hand, when ending a high-speed welding, the molten metal pool is disturbed by a sudden braking. In order to have a high-speed welding introduced successfully in normal production, these problems need to be solved.

Patent Document 1

Japanese Patent Unexamined Publication No. 2001-113373

SUMMARY OF THE INVENTION

In a tandem arc welding system, the present method of controlling arc welding carries out the shifting of operation speed continuously and mildly. By so doing, a sharp change in the speed of weld wire supply, which is made in an effort to try to comply with change of operation speed, can be moderated. As the results, it implements a stable control of welding.

In a tandem arc welding system operating on an operation program for welding a welding target in accordance with welding conditions specified by the operation program, the present control method carries out those control actions which include steps of making a welding torch to start traveling from welding start point at an initial speed after fore-going electrode started arcing; shifting continuously the speed of welding torch from the initial speed to a first speed at least in one of those periods, a first time span during which the welding torch proceeds, a certain time required for the welding torch to proceed a first distance and a certain time span required for the welding torch to arrive at a first position; shifting continuously at least one of those instructions sent to a welder of fore-going electrode in synchronization with the continuous speed change from the initial to the first speed regarding the welding current, the weld wire supply speed and the welding voltage; making hind-going electrode to start arcing at least at one of those timings, at the moment when action for a first time span is completed, at the moment when action for a first distance is completed and at the moment when action before arriving at a first place is completed; shifting the speed of welding torch continuously to a second speed in at least one of those periods, a second time span during which the welding torch proceeds, a certain time needed for the welding torch to proceed a second distance and a certain time span needed for the welding torch to arrive at a second place; and changing continuously at least one of those instructions sent to a welder of the fore-going electrode in synchronization with the continuous speed change to a second speed regarding the welding current, the weld wire supply speed and the welding voltage, and at least one of those instructions sent to a welder of the hind-going electrode regarding the welding current, the weld wire supply speed and the welding voltage.

In a tandem arc welding system operating on an operation program for welding a welding target in accordance with welding conditions specified by the operation program, the present control method carries out the control actions which include the steps of terminating the arcing of fore-going electrode at least at one of those moments, when the welding torch arrived just before a place designated as the welding end in terms of time length, when the welding torch arrived just before the end of a specified distance and when the welding torch arrived at a designated place locating just before welding end point; shifting continuously the speed of welding torch to a specified speed while the welding torch is proceeding towards the welding end point; changing continuously at least one of those instructions sent to a welder of the hind-going electrode in synchronization with the continuous speed change regarding the welding current, the weld wire supply speed and the weld voltage; and terminating the welding by terminating the arcing of hind-going electrode when the welding torch arrived at the welding end point.

In an arc welding system where the welding torch is operating on an operation program for welding a welding target in accordance with welding conditions specified by the operation program, the present control method carries out the control actions which include the steps of shifting continuously the speed of welding torch in at least one of those periods, a time span during which the welding torch proceeds starting from a certain specified place, a certain time for the welding torch to proceed a certain specified distance and a certain time span needed for the welding torch to arrive at a specified place; and changing continuously at least one of those instructions sent to welder in synchronization with the continuous speed change of the welding torch from a speed before change to a speed after change regarding the welding current, the weld wire supply speed and the welding voltage.

In a tandem arc welding system operating on an operation program for welding a welding target in accordance with welding conditions specified by the operation program, the present control method carries out the control actions which include the steps of shifting continuously the speed of welding torch in at least one of those periods, a specified time span during which the welding torch proceeds starting from a certain specific place, a certain time needed for the welding torch to proceed a certain specified distance and a certain time span needed for the welding torch to arrive at a certain designated place; and changing continuously at least one of those instructions sent to a welder of the fore-going electrode in synchronization with the speed change of welding torch from a speed before change to a speed after change regarding the welding current, the weld wire supply speed and the welding voltage, and at least one of those instructions sent to a welder of hind-going electrode regarding the welding current, the weld wire supply speed and the welding voltage.

REFERENCE MARKS IN THE DRAWINGS

120 Control Unit
130 Welder
131 Power Cable
132 Grounding Cable
133 Control Line
140 Welder
141 Grounding Cable
142 Power Cable
143 Control Line
150, 550 Welding Torch
160 Welding Object
201 Fore-going Electrode Tip
202 Hind-going Electrode Tip
203 Fore-going Weld Wire
204 Hind-going Weld Wire
205 Fore-going Arc
206 Hind-going Arc
207 Molten Weld Metal
210 Nozzle
270 Weld Bead
303 Fore-going Electrode
304 Hind-going Electrode
381 Welding Start Point
382 First Point of Welding Start Section
383 Second Point of Welding Start Section
482 Welding End Point
481 First Point of Welding End Section
581 First Point
582 Second Point
L1 Distance from Welding Start Point to First Point of Welding Start Section
L2 Distance from First Point of Welding Start Section to Second Point of Welding Start Section
L5 Distance from First Point to Second Point
LE Distance from First Point of Welding End Section to Welding End Point
V0 Initial Speed
V1 First Speed
V2 Second Speed
Va Speed at First Point
Vb Speed at Second Point
T1 Time Span from Welding Start Point to First Point of Welding Start Section
T2 Time Span from First Point of Welding Start Section to Second Point of Welding Start Section
TE Time Span from First Point of Welding End Section to Welding End Point
T5 Time Span from First Point to Second Point

DETAILED DESCRIPTION OF PREFERRED EMBODIMENTS

Exemplary embodiments of the present invention are described in the following referring to FIG. 1 through FIG. 5.
(First Exemplary Embodiment)

Figure 1:
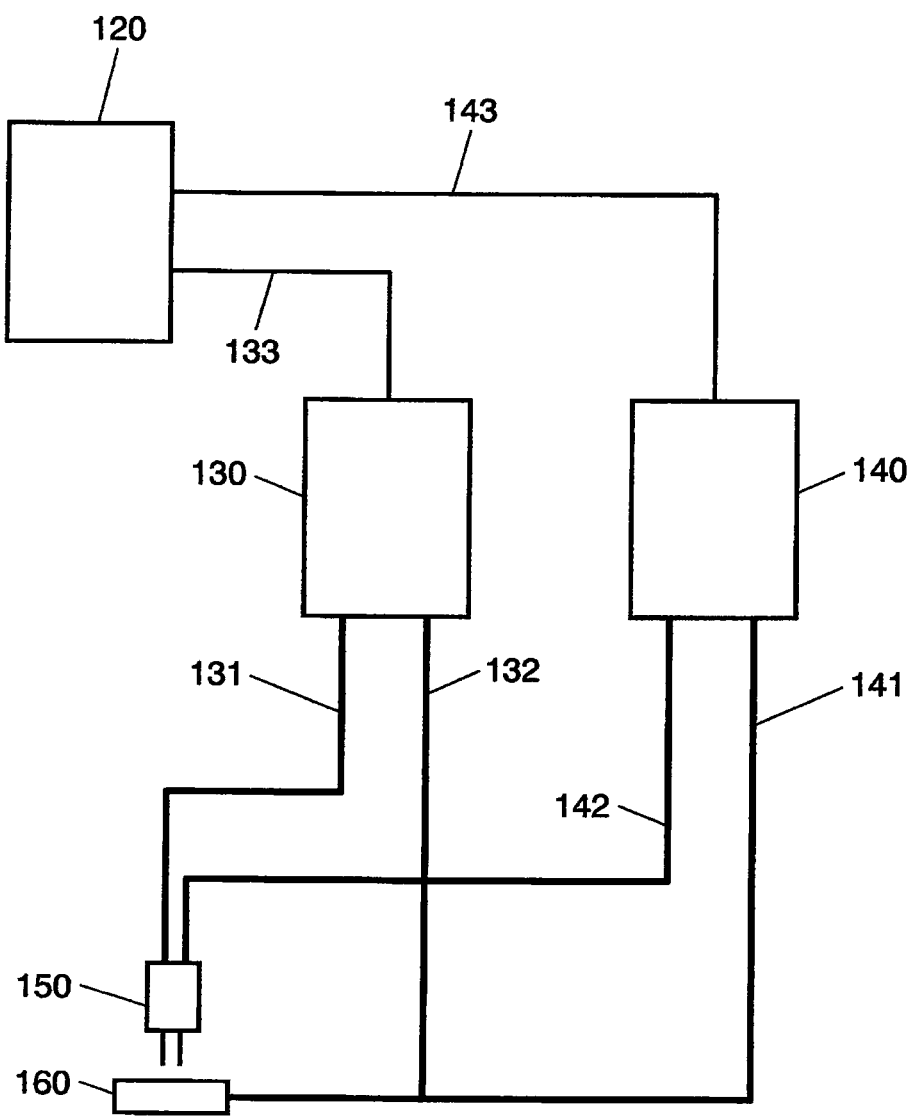
FIG. 1 shows the outline structure of a tandem arc welding system.
Figure 3:
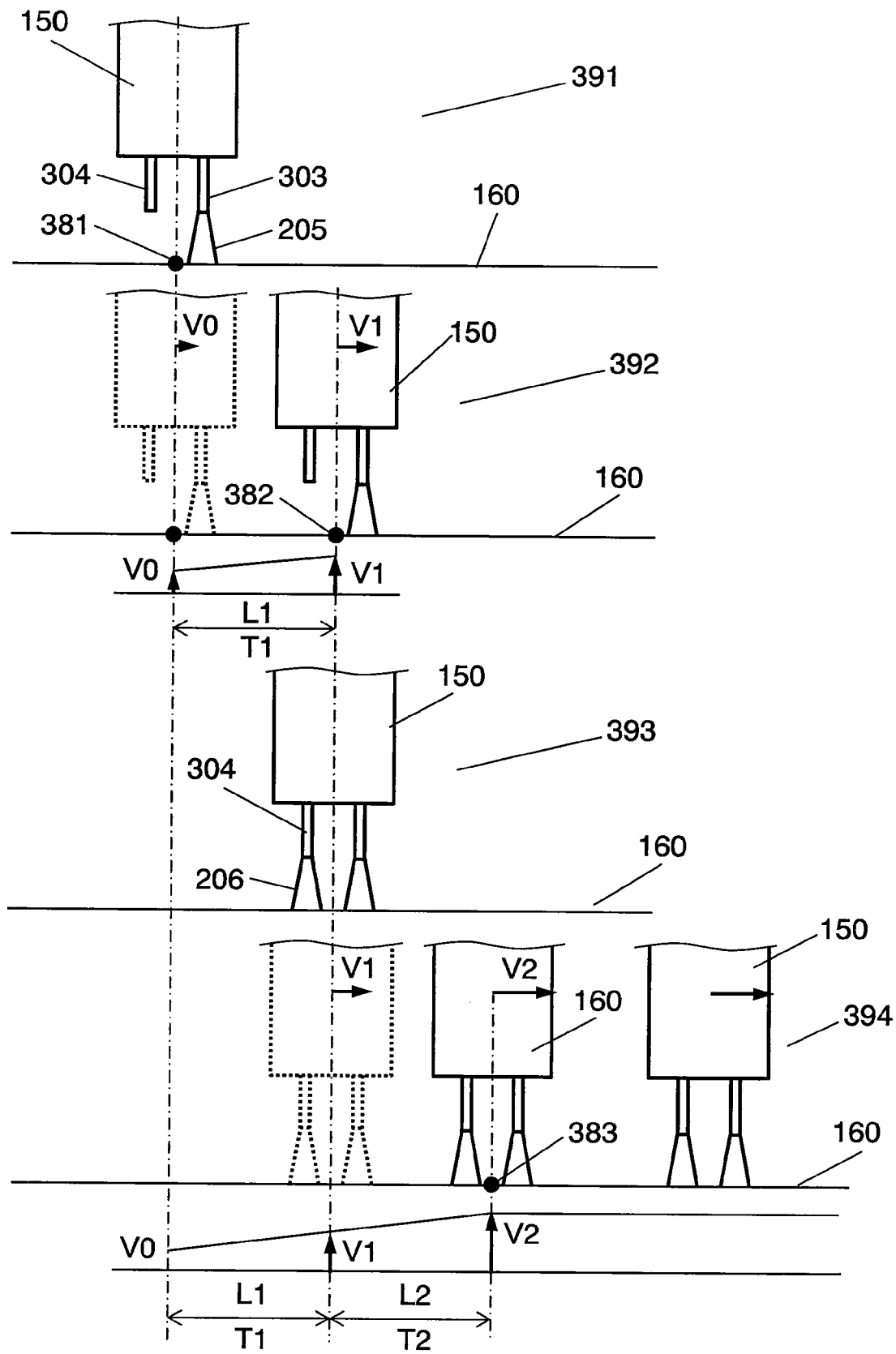
FIG. 3 is an illustration used to describe the welding operation in the neighborhood of welding start section in an exemplary embodiment of the present invention.

FIG. 3 shows the sequence and the contents of a welding operation carried out in accordance with first embodiment of the present invention using a tandem arc welding system mounted with integrated 2-electrode welding torch 150 (shown in FIG. 1). Operation of the present welding system proceeds in the order as shown in FIG. 3, starting from state 391 to state 392, state 393 and state 394.

In state 391, as soon as integrated 2-electrode welding torch 150 arrives at welding start point 381, it starts generating fore-going arc 205 between fore-going electrode 303 and welding object 160, and then starts traveling along the welding direction (from the left to the right, in FIG. 3). Traveling of welding torch 150 begins from welding start point 381 at initial speed V0. Fore-going electrode 303 designates with fore-going electrode tip 201 and fore-going weld wire 203 included.

State 392 shows the state when welding torch 150 arrived at first point of welding start section 382. While welding torch 150 keeps its welding action going, it shifts the speed of traveling so that it becomes a first speed V1 upon reaching first point of welding start section 382. First point of welding start section 382 is specified in terms of a location, a distance L1 from welding start point 381, or a travel time T1 from welding start point 381. When welding torch 150 starts traveling from welding start point 381 towards first point of welding start section 382, control unit 120 (ref. FIG. 1) sends welder 130 (ref. FIG. 1) of fore-going electrode 303 such welding conditions for fore-going electrode 303 that correspond to initial speed V0 at welding start point 381. Contents of the welding conditions contain at least one of those instructions regarding the welding current, the weld wire supply speed and the welding voltage. When welding torch 150 arrives at first point of welding start section 382, control unit 120 sends welder 130 of fore-going electrode 303 such welding conditions for fore-going electrode 303 that corresponds to first speed V1. Contents of the welding conditions contain at least one of those instructions regarding the welding current, the weld wire supply speed and the welding voltage. While welding torch 150 is traveling between welding start point 381 and first point of welding start section 382, control unit 120 sends welder 130 of fore-going electrode 303 in line with the changing speed of welding torch 150 at least one of those instructions regarding the welding current, the weld wire supply speed and the welding voltage.

Figure 2:
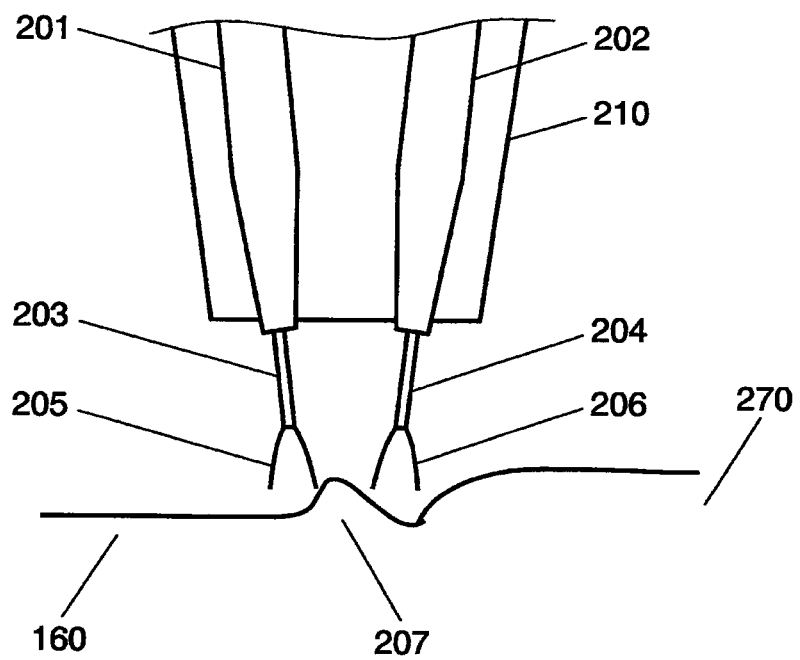
FIG. 2 shows a typified state of welding conducted with an integrated 2-electrode welding torch.

At first point of welding start section 382 in state 393, hind-going arc 206 is generated between hind-going electrode 304 and welding object 160. Hind-going electrode 304 designates with hind-going electrode tip 202 and hind-going weld wire 204 (ref. FIG. 2) included.

In state 394, the travel speed is shifted so as it becomes a second speed V2 when welding torch 150 arrives at second point of welding start section 383. Second point of welding start section 383 is specified in terms of a location, a distance L2 from first point of welding start section 382, or a travel time T2 from first point of welding start section 382.

While welding torch 150 is moving from first point of welding start section 382 to second point of welding start section 383, control unit 120 sends, at first point of welding start section 382, such welding conditions for fore-going electrode 303 that correspond to first speed V1 to welder 130 of fore-going electrode 303. The welding conditions contain at least one of those instructions regarding the welding current, the weld wire supply speed and the welding voltage. At the same time, control unit 120 sends such welding conditions for hind-going electrode 304 that correspond to first speed V1 to welder 140 (ref. FIG. 1) of hind-going electrode 304. The welding conditions contain at least one of those instructions regarding the welding current, the weld wire supply speed and the welding voltage. When welding torch 150 arrives at second point of welding start section 383, control unit 120 sends welder 130 of fore-going electrode 303 such welding conditions for fore-going electrode 303 that correspond to second speed V2. The welding conditions contain one of those instructions regarding the welding current, the weld wire supply speed and the welding voltage. At the same time, control unit 120 sends welder 140 of hind-going electrode 304 such welding conditions that correspond to second speed V2. The welding conditions contain at least one of those instructions regarding the welding current, the weld wire supply speed and the welding voltage. Between first point of welding start section 382 and second point of welding start section 383, control unit 120 sends welder 130 of fore-going electrode 303 and welder 140 of hind-going electrode 304 at least one of those instructions regarding the welding current, the speed of weld wire supply and the welding voltage, corresponding to the changing speed of welding torch 150.

As described in the above, a method of controlling arc welding on an arc welding system in accordance with a first exemplary embodiment shifts the operation speed continuously and mildly. By so doing, a sharp change in the speed of weld wire supply which is caused as the results of efforts to try to comply with an abrupt change in the operation speed can be moderated. Furthermore, it can carry out welding operation by providing at least one of those instructions regarding the welding current, the speed of weld wire supply and the welding voltage, corresponding to operation speed. This helps implementing a tandem arc welding for the welding start section in a stable manner.

In place of the one of instructions regarding the welding current, the speed of weld wire supply and the welding voltage at second point of welding start section 383, normal welding conditions, or intrinsic welding conditions, may be used.

(Second Exemplary Embodiment)

Those portions in second embodiment identical to those of first embodiment are designated using the same symbols, and detailed description on which portion is eliminated. Second embodiment relates to the ending of a welding operation.

Figure 4:
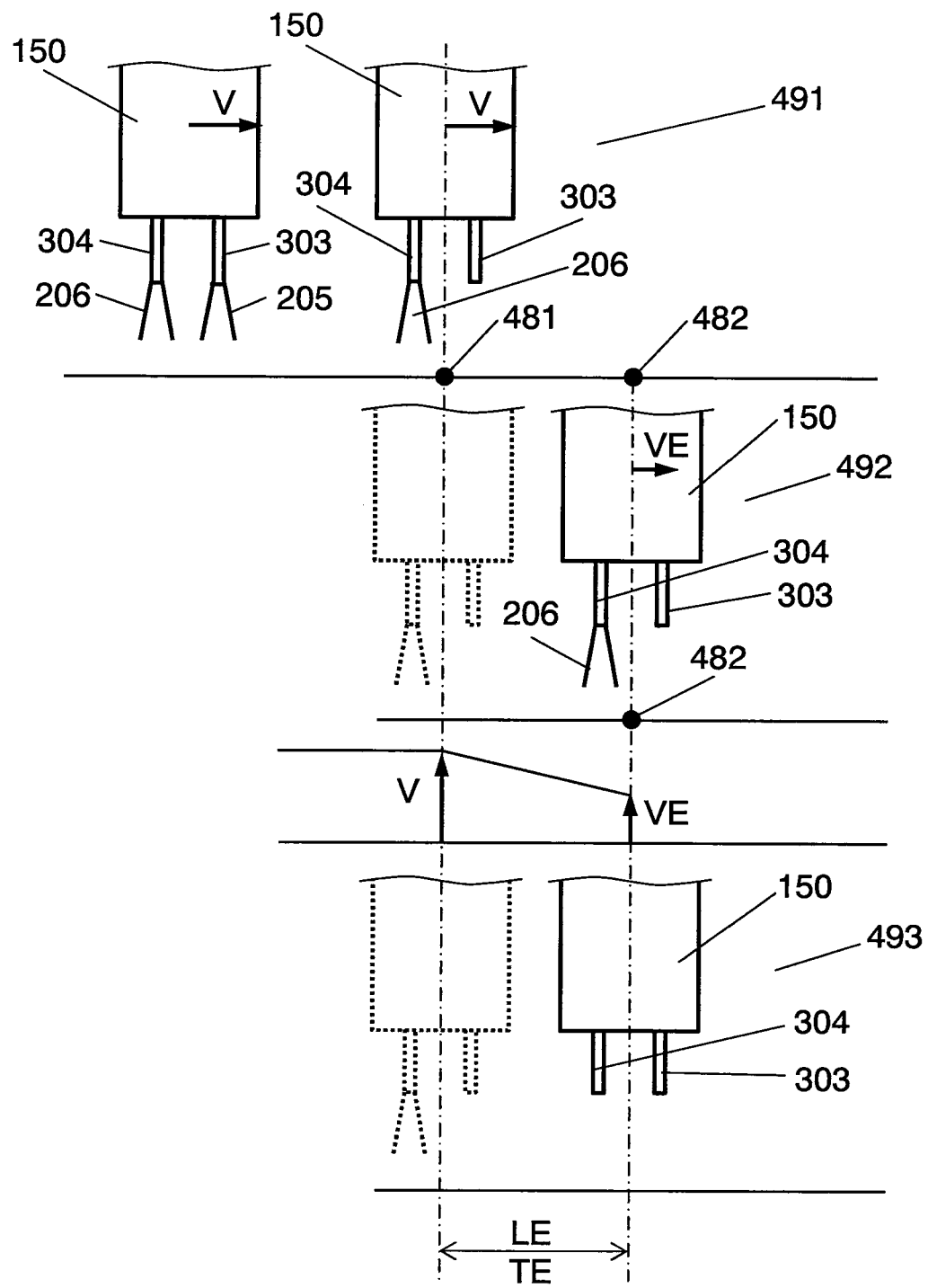
FIG. 4 is an illustration used to describe the welding operation in the neighborhood of welding end section in an exemplary embodiment of the present invention.

FIG. 4 shows the sequence and the contents of a welding operation carried out by a tandem arc welding system which uses integrated 2-electrode welding torch 150 (ref. FIG. 150). Actions in accordance with second embodiment proceeds in the order, starting from state 491 in FIG. 4, state 492 to state 493.

In state 491 of FIG. 4, fore-going arc 205 is terminated when integrated 2-electrode welding torch 150, which has been traveling along the welding direction (from the left to the right in FIG. 4) at speed V, arrives at first point of welding end section 481 which locates before second point of welding end section 482. Hind-going arc 206 is kept on arcing as before. First point of welding end section 481 is specified in terms of a location, a distance LE from welding end point 482 or a travel time from welding end point 482.

In state 492, while the action along the welding direction is kept on going, the speed of welding torch 150 is shifted from V at first point of welding end section 481 so as it becomes final speed VE at welding end point 482. At first point of welding end section 481, welding conditions for hind-going electrode 304 which correspond to speed V are sent to welder 140 (ref. FIG. 1) of hind-going electrode 304. The welding conditions contain at least one of those instructions regarding the welding current, the weld wire supply speed and the welding voltage. When welding torch 150 arrives at welding end point 482, welding conditions for hind-going electrode 304 which correspond to final speed VE are sent to welder 140 of hind-going electrode 304. The welding conditions contain at least one of those instructions regarding the welding current, the weld wire supply speed and the welding voltage.

Between first point of welding end section 481 to welding end point 482, welding conditions for hind-going electrode 304 which correspond to the changing speed are sent to welder 140 of hind-going electrode 304. The welding conditions contain at least one of those instructions regarding the welding current, the weld wire supply speed and the welding voltage.

In state 493, when welding torch 150 reaches welding end point 482, hind-going arc 206 is also terminated. And the welding operation is finished.

As described in the above, a method of controlling arc welding on an arc welding system in accordance with second exemplary embodiment shifts the speed of operation continuously and mildly. By so doing, a sharp change in the speed of weld wire supply which is caused as the result of efforts to try to comply with abrupt change of operation speed can be moderated. Furthermore, it can carry out welding operation by providing at least one of those instructions regarding the welding current, the speed of weld wire supply and the welding voltage, corresponding to operation speed. This helps implementing a tandem arc welding for the welding end section in a stable manner.

(Third Exemplary Embodiment)

Figure 5:
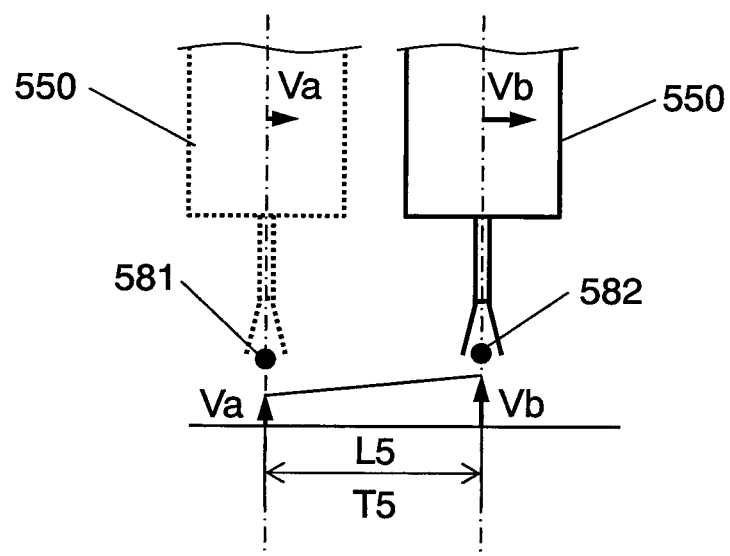
FIG. 5 is an illustration used to describe the welding operation in an exemplary embodiment of the present invention.

A third embodiment is described below. FIG. 5 illustrates a welding operation in the present invention on generally used welding systems, not limited to a tandem arc welding system. Exemplified in FIG. 5 is not a 2-electrode torch, but it is welding torch 550 having a single electrode. Welding torch 550 is a counterpart to welding torch 150 of FIG. 1. In the present third embodiment, however, welder 140, grounding cable 141, power cable 142 and control line 143 are not needed.

In FIG. 5, arcing torch 550 which has been traveling in the welding direction (from the left to the right in FIG. 5) shifts the traveling speed gradually so as it becomes Va at first point 581, and Vb at second point 582. Second point 582 is specified in terms of a location, a distance L5 from first point 581 or a time span T5 from first point 581. While welding torch 550 is traveling from first point 581 to second point 582, control unit 120 (ref. FIG. 1) sends at first point 581 such welding conditions that correspond to speed Va to welder 130 (ref. FIG. 1). The welding conditions contain at least one of those instructions regarding the welding current, the weld wire supply speed and the welding voltage. When welding torch 550 arrives at second point 582, control unit 120 sends such welding conditions that correspond to speed Vb to welder 130. The welding conditions contain at least one of those instructions regarding the welding current, the weld wire supply speed and the welding voltage. While welding torch 150 is traveling from first point 581 to second point 582, control unit 120 sends welder 130 at least one of those instructions regarding the welding current, the weld wire supply speed and the welding voltage, as the welding conditions that correspond to the changing speed.

As described in the above, a method of controlling arc welding in accordance with the present embodiment on arc welding system shifts the operation speed continuously and mildly. By so doing, a sharp change in the supply speed of weld wire which is caused as the result of efforts to try to comply with an abrupt change in the operation speed can be moderated. Furthermore, a welding operation can be implemented by providing at least one of those instructions regarding the welding current, the speed of weld wire supply and the welding voltage corresponding to the speed of operation. This helps realizing a stable welding.

Although welding torch 550 having a single electrode has been exemplified in third embodiment, it is of course possible to carry out similar operation in a tandem arc welding which uses an integrated 2-electrode welding torch, or a welding torch having two single electrodes disposed in proximity.

Furthermore, such advantage identical to that described in the above can be realized also by shifting the speed of welding operation continuously from a speed before change to a speed after change in a certain specified travel time from a certain specified location, a time needed for proceeding a certain specified distance or a time span needed for arriving at a certain specified location, and practicing the following actions in synchronization with the above-described speed shift: Changing continuously at least one of those instructions for a welder of the fore-going electrode, among two electrodes, regarding the welding current, the speed of weld wire supply and the welding voltage, and at least one of those instructions for a welder of hind-going electrode regarding the welding current, the speed of weld wire supply and the welding voltage.

As described in the first through the third embodiments, a method of controlling arc welding in the present invention shifts the operation speed continuously and mildly. By so doing, a sharp change in the speed of weld wire supply which is caused as the result of efforts to try to comply with an abrupt change of operation speed can be moderated. Furthermore, welding can be implemented by providing at least one of those instructions regarding the welding current, the speed of weld wire supply and the welding voltage, corresponding to operation speed. This helps controlling a welding operation in a stable manner.

INDUSTRIAL APPLICABILITY

A method of controlling arc welding in the present invention helps realizing a stable control of welding. It would bring about a substantial advantage in the industry when introduced for controlling the high-speed arc welding, for example, a tandem arc welding.

What is claimed is:

1. A method of controlling arc welding in a tandem arc welding system operating on an operation program for welding a welding target in accordance with welding conditions specified by the operation program, comprising the steps of:

making a welding torch start traveling from a welding start point at an initial speed, relative to a weld line, after a fore-going electrode started arcing;

continuously and linearly increasing a travel speed of the welding torch, relative to the weld line, from the initial speed to a first speed while traveling from the welding start point to a first point, while the fore-going electrode continues arcing, wherein the first point is determined based on at least one of a first specific location on the welding target, a predetermined travel time from the welding start point, or a predetermined distance from the welding start point;

continuously and gradually changing, in synchronization with the continuous and linear increasing of the travel speed from the initial speed to the first speed, an instruction for a welder associated with the fore-going electrode to linearly increase, in proportion to the linear increase of the travel speed, at least one of a welding current, a weld wire supply speed, or a welding voltage of the welder associated with the fore-going electrode;

making a hind-going electrode start arcing when the welding torch reaches the first point;

further continuously and linearly increasing the travel speed of the welding torch, relative to the weld line, from the first speed to a second speed while traveling from the first point to a second point, while both the fore-going electrode and the hind-going electrode continue arcing, wherein the second point is determined based on at least one of a second specific location on the welding target, a first predetermined travel time from the first point, or a first predetermined distance from the first point; and continuously and gradually changing, in synchronization with the further continuous and linear increasing of the travel speed from the first speed to the second speed, while both the fore-going electrode and the hind-going electrode continue arcing, the instruction for the welder associated with the fore-going electrode to linearly increase, in proportion to the linear increase of the travel speed to the second speed, at least one of the welding current, the weld wire supply speed, or the welding voltage of the welder associated with the fore-going electrode, and an instruction for a welder associated with the hind-going electrode to linearly increase, in proportion to the linear increase of the travel speed to the second speed, at least one of a welding current, a weld wire supply speed, or a welding voltage of the welder associated with hind-going electrode.

2. The method of controlling arc welding recited in claim 1, wherein when the welding torch reaches the second point the instruction for the welder of the fore-going electrode that regards at least one of the welding current, the weld wire supply speed, or the welding voltage is under normal welding conditions, and the instruction for the welder of the hind-going electrode that regards at least one of the welding current, the weld wire supply speed, or the welding voltage is under normal welding conditions.

3. The method of controlling arc welding recited in claim 1, further comprising:

terminating arcing of the fore-going electrode when welding torch reaches a first end point, wherein the first end point is determined based on at least one of a third specific location relative to a welding end point, a second predetermined travel time to the welding end point, or a predetermined distance to the welding end point;

continuously and linearly decreasing the travel speed of the welding torch, relative to the weld line, from a third speed of the welding torch at the third point to a certain specified speed while the welding torch travels to the welding end point, while the hind-going electrode continues arcing;

continuously and gradually changing, in synchronization with the continuous and linear decreasing of the travel speed, an instruction for a welder associated with the hind-going electrode to linearly decrease, in proportion to the linear decrease of the travel speed, at least one of the welding current, the weld wire supply speed, or the weld voltage of the welder associated with the hind-going electrode, while the hind-going electrode continues arcing; and terminating arcing of the hind-going electrode when the welding torch reaches the welding end point, and ending the welding.

4. A method of controlling arc welding in a tandem arc welding system operating on an operation program for welding a welding target in accordance with welding conditions specified by the operation program, comprising the steps of:

continuously and linearly shifting a travel speed of a welding torch, relative to a weld line, while both the fore-going electrode and the hind-going electrode continue arcing, from a first speed to a second speed during a time period defined by at least one of a predetermined time span from when the welding torch starts proceeding from a certain specified place, an amount of time required for the welding torch to proceed a certain specified distance, or an amount of time required for the welding torch to arrive at a certain specified place from a specified start position; and continuously and gradually changing, in synchronization with the continuous and linear shifting of the travel speed of the welding torch from the first speed to the second speed, while both the fore-going electrode and the hind-going electrode continue arcing, an instruction for a welder associated with a fore-going electrode to shift, in proportion to the linear shift of the travel speed, at least one of a welding current, a weld wire supply speed, or a welding voltage of the welder associated with the fore-going electrode, and an instruction for a welder of a hind-going electrode to shift, in proportion to the linear shift of the travel speed, at least one of a welding current, a weld wire supply speed, or a welding voltage of the welder associated with the hind-going electrode.

* * * * *